C. DANES.
SAW SET.
APPLICATION FILED APR. 17, 1914.
1,127,865.
Patented Feb. 9, 1915.
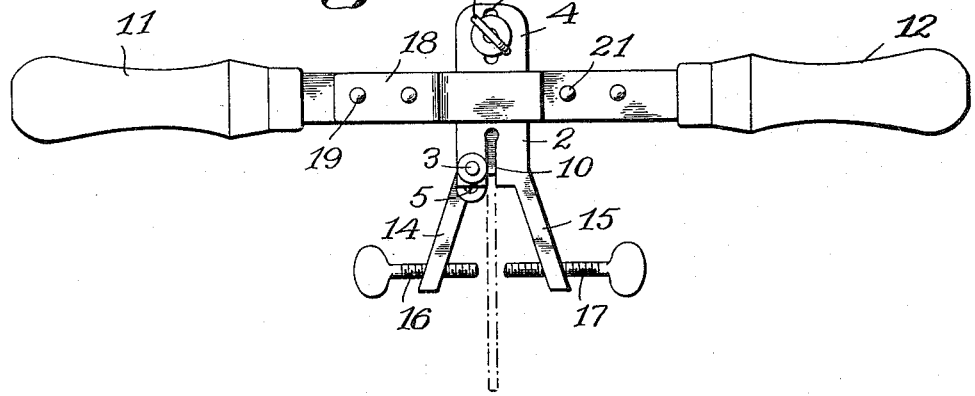
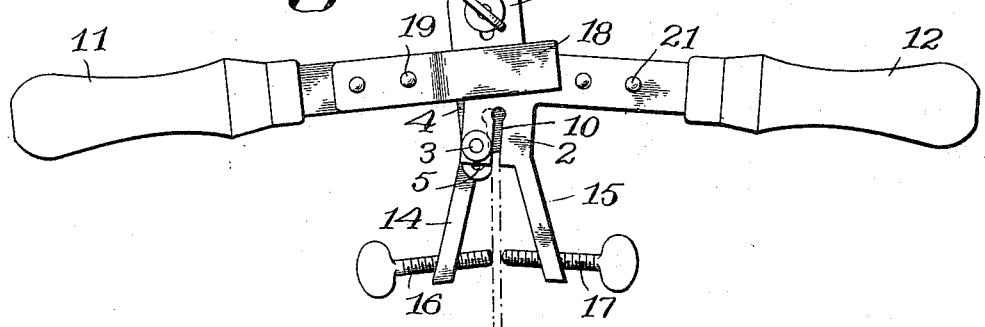
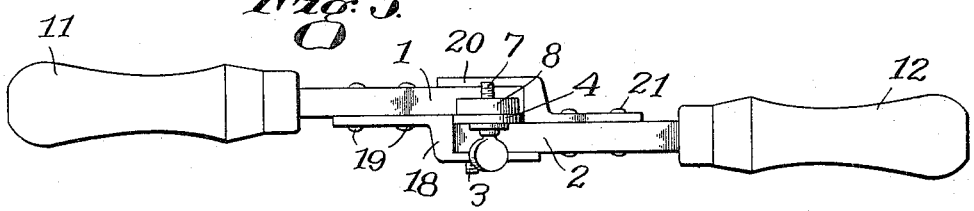
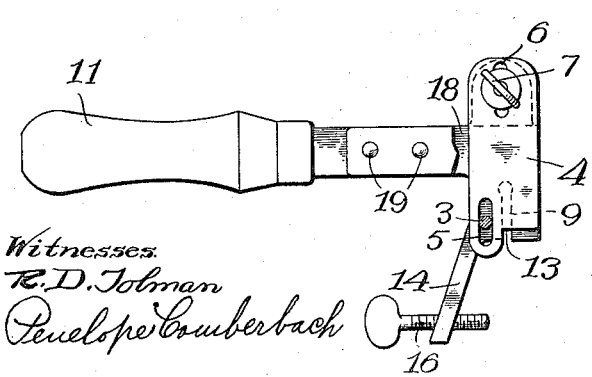
Witnesses.
R. D. Tolman
Penelope Cumberbach
Inventor
Charles Danes.
By Rufus B. Fowler
Attorney

UNITED STATES PATENT OFFICE.

CHARLES DANES, OF CHARLTON, MASSACHUSETTS, ASSIGNOR OF ONE-HALF TO JOSEPH O. MURREY, OF CHARLTON, MASSACHUSETTS.

SAW-SET.

1,127,865.

Specification of Letters Patent.

Patented Feb. 9, 1915.

Application filed April 17, 1914. Serial No. 832,622.

*To all whom it may concern:*

Be it known that I, CHARLES DANES, a citizen of the Dominion of Canada, residing at Charlton, in the county of Worcester and Commonwealth of Massachusetts, have invented a new and useful Improvement in Saw-Sets, of which the following, taken in connection with the accompanying drawing, is a specification.

My invention relates to saw sets and one of its objects is to provide an improved form of saw set adapted to set or bend two adjacent teeth of a saw simultaneously toward opposite sides of the saw.

The various forms of saw sets now commonly in use set alternate teeth of a saw successively and toward one side of the saw and then, after reversing either the saw or the set, the remaining teeth are set toward the other side of the saw. There is obviously a tendency for these latter teeth, as they are being set, to draw the others with them and straighten them up slightly so that finally the teeth will be set more or less unequally toward the opposite sides of the saw. This will cause the saw to make an uneven rather than a clean straight cut.

Another object of the invention is to provide adjustable means for determining with accuracy the degree of set given to each tooth of the saw.

Other objects and advantages will appear from the following description taken in connection with the accompanying drawing, in which—

Figure 1 is a face view of a saw set constructed in accordance with my invention and in position to set the teeth of a saw shown in broken lines; Fig. 2 is a similar view of the set but after the teeth of the saw have been set; Fig. 3 is an edge view of the set; and Fig. 4 is a face view of one of the setting members together with an adjustable plate for determining the extent to which the teeth of a saw may enter the setting members.

Like reference characters are used to represent similar parts in the different figures.

In the form of the invention shown in the drawing, the set includes two setting members 1 and 2 connected by a pivot 3. A plate 4 is confined between the setting members 1 and 2, the plate 4 having a slot 5 through which the pivot 3 passes and a second slot 6 which receives a set screw 7 threaded into a lug 8 formed on the setting member 1. The setting members 1 and 2 are provided with normally alined slots 9 and 10 respectively adapted to receive adjacent teeth of a saw, as indicated in Fig. 1. Handles 11 and 12 are attached to the setting members 1 and 2 and by means of these handles the setting members may be turned in opposite directions about their connecting pivot 3, as indicated in Fig. 2, so as to set the saw teeth in the slots 9 and 10 simultaneously in opposite directions. The lower edge 13 of the plate 4 enters the angle between the two saw teeth to be set and serves as a gage to position the teeth of the saw properly in the slots 9 and 10. The plate 4 may be adjusted longitudinally so as to admit the teeth of the saw to a predetermined distance into the slots 9 and 10 and so predetermine the exact distances from the points of the teeth which are to be bent over or set. The plate 4 is held in any adjusted position by tightening the set screw 7.

The setting members 1 and 2 are provided with arms 14 and 15 adapted to extend on opposite sides of the saw when in position to be set. Thumb screws 16 and 17 are threaded into the arms 14 and 15 near their free extremities so that the inner ends of the thumb screws will come into contact with the sides of a saw and limit the angle at which the teeth of the saw may be set. These thumb screws may be turned in or out to vary this angle at which the teeth may be set. The threads on the two screws 16 and 17 are preferably of the same pitch so that by giving them an equal number of turns the angle of set imparted to two saw teeth by the setting members 1 and 2 may be varied to the same degree.

A guide 18 is attached at one end to the setting member 1 by rivets 19, the other end of the guide 18 being offset parallel to the setting member 1 and contacting with the outer face of the setting member 2. A similar guide 20 attached to the setting member 2 by rivets 21 has its free end offset so as to contact with the outer face of the setting member 1. These guides 18 and 20 hold the two setting members firmly together and prevent bending of the pivot 3 by the force applied in setting the teeth of a saw.

Having thus described my invention what

I claim as new and desire to secure by Letters Patent is:

1. A saw set including two setting members having slots to receive two teeth of a saw, said members being pivoted together about an axis near the entrances to said slots, and means for turning the setting members about said axis to set the two saw teeth in opposite directions.

2. A saw set including two setting members adapted to engage two adjacent teeth of a saw, a gage arranged to contact with the angle between said teeth to determine the extent of the engagement between said members and the teeth, and means for moving said members to set the two teeth in opposite directions.

3. A saw set including two setting members adapted to engage two adjacent teeth of a saw, a gage, means for securing the gage in adjusted position between the two setting members to contact with the angle between the two saw teeth, whereby the extent of the engagement between the setting members and the saw teeth may be predetermined, and means for moving the setting members to set the teeth in opposite directions.

4. A saw set including two setting members having slots to receive adjacent teeth of a saw, a plate between the setting members to limit the distance to which the teeth may enter said slots, and means for turning the setting members about an axis to set the teeth.

5. A saw set including two setting members having slots to receive adjacent teeth of a saw, an adjustable plate between the setting members to predetermine the distance to which the teeth may enter said slots, and means for turning the setting members about an axis to set the teeth.

6. A saw set including two setting members having slots to receive adjacent teeth of a saw, means for turning the setting members in opposite directions about an axis to set the teeth, and means carried by the setting members for contacting with opposite sides of the saw to limit the angle through which the setting members may turn.

Dated this eleventh day of April, 1914.

CHARLES DANES.

Witnesses:
PENELOPE COMBERBACH,
NELLIE WHALEN.

Copies of this patent may be obtained for five cents each, by addressing the "Commissioner of Patents, Washington, D. C."